Oct. 3, 1950 W. W. PORTER 2,524,077
PEA HARVESTER AND LOADING MACHINE
Filed Oct. 18, 1945 10 Sheets-Sheet 3

Fig. 3

Inventor
Wellington W. Porter
By Frank Keefer
Attorney

Oct. 3, 1950          W. W. PORTER          2,524,077

PEA HARVESTER AND LOADING MACHINE

Filed Oct. 18, 1945          10 Sheets-Sheet 6

Inventor
Wellington W. Porter
By Frank Keifer
Attorney

Oct. 3, 1950  W. W. PORTER  2,524,077
PEA HARVESTER AND LOADING MACHINE
Filed Oct. 18, 1945  10 Sheets-Sheet 7

Inventor
Wellington W. Porter
By Frank Keiper
Attorney

Oct. 3, 1950 W. W. PORTER 2,524,077
PEA HARVESTER AND LOADING MACHINE
Filed Oct. 18, 1945 10 Sheets-Sheet 10

Inventor
Wellington W. Porter
By Frank Keifer
Attorney

Patented Oct. 3, 1950

2,524,077

UNITED STATES PATENT OFFICE 2,524,077

PEA HARVESTER AND LOADING MACHINE

Wellington W. Porter, Junius, N. Y.

Application October 18, 1945, Serial No. 623,134

17 Claims. (Cl. 56—185)

The object of this invention is to provide a machine comprising a harvester that will both cut or harvest pea vines in the field and elevate and load them onto a truck traveling along with the harvester.

Another object of the invention is to provide a machine that will both cut or harvest pea vines standing in the field which machine is provided with cutters and an inclined deck or ramp just back of the cutters and means for conveying the cut pea vines up the inclined platform.

Another object of the invention is to provide a machine that will both cut or harvest pea vines standing in the field which machine is provided with cutters and an inclined deck or ramp just back of the cutters and means for conveying the cut pea vines up the inclined platform, such as kicker bars, said machine being also provided with an endless conveyor placed back of and below the upper edge of the inclined ramp which conveyor moves transversely to the platform and is adapted to receive the cut pea vines. This conveyor can be used to dump the pea vines on the ground in a narrow windrow or it can discharge the pea vines onto the elevator which will now be referred to.

Another object of the invention is to combine with the foregoing mower, inclined deck, kicker bars and endless conveyor, an elevator on which the endless conveyor discharges the pea vines which conveyor elevates the pea vines and discharges them onto a truck moving along with the harvester.

Another object of the invention is to provide a harvester in which the mower can be detached therefrom and used separately.

Another object of the invention is to provide a mower and harvester in combination, the harvester having a separate frame by which it can be attached to the frame of the mower so that they will move together.

These and other objects of the invention will be illustrated in the drawings described in the specification and pointed out in the claims at the end thereof.

In the drawings:

Figure 3 is the diagrammatic view of the power mechanism that drives the various moving parts of the harvester and loader.

Figures 1, 2, 3, 4, 14, 15 and 23 are all on substantially the same scale.

Figures 5, 6, 7, 8, 9, 10, 11, 12, 13, 17, 19, 20, 21, 22 and 24 are all on substantially the same scale which scale is somewhat larger than the scale of the seven figures mentioned above.

Figures 16, 18 and 25 are on a somewhat smaller scale than the seven figures mentioned above.

In the drawings, like reference numerals indicate like parts.

Figures 16, 17:
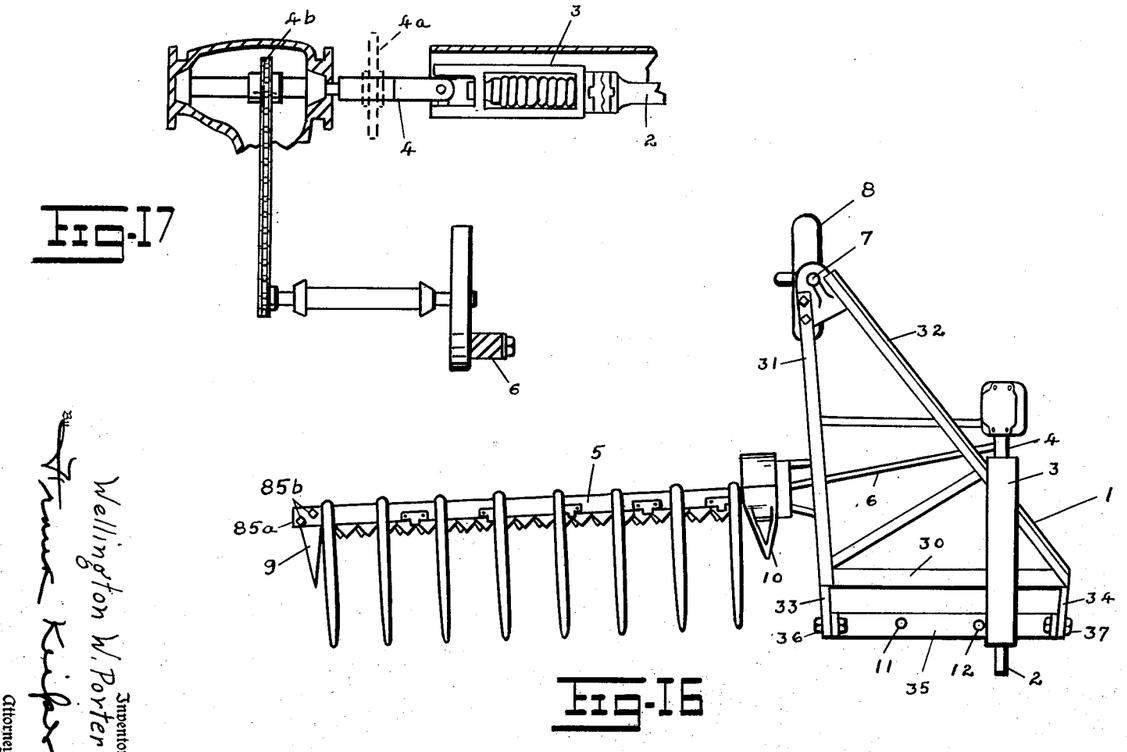
Figure 16 is a diagrammatic or a top plan view of a so-called No. 5 John Deere power mower.
Figure 17 is a diagrammatic view showing the elevation of the drive mechanism of the John Deere mower extending from the tractor to the pitman that reciprocates the cutter bar.

In the drawings, reference numeral 1 indicates the triangular frame of the mower (see Figures 16 and 17) 2 indicates the drive shaft by which the mowing, harvesting and elevating mechanism is driven from the power take-off on the standard form of tractor which is used in drawing this machine. 3 is the slip clutch which is used as a safety device to permit the shaft 2 to turn when the shaft 4 is held against turning by an obstruction in the cutter bar 5. 6 is the so-called pitman by which the cutting bar acting as the initial gathering means as it passes closely over the ground contour is reciprocated. All this is standard well-known construction in the standard John Deere No. 5 power mower. At 7 the caster wheel 8 is pivotally attached to the frame in the standard construction when the mower is used without my harvester and loader. The power mower is supported by the caster wheel 8 and two shoes 9 and 10 that are attached to the underside of the stationary cutter bar. These shoes ride over the ground and conform to any irregularities therein permitting the stationary cutter bar to rise or fall as the surface of the ground may require. All this is standard construction in the power mower above referred to and is used in the mower when used in connection with the harvester, (and mower) except that when the mower is used in connection with the harvester and mower the caster wheel 8 is removed and the frame of the combined apparatus is supported by two wheels which will presently be described, and certain minor modifications have been made that will be described in their proper place.

It will also be understood that when the mower is used separately with the tractor it is bolted to an adapter on the tractor and for this purpose, bolt holes 11 and 12 are provided in the frame of the mower by which it is connected to the adapter on the tractor, all this being standard construction when used normally without my harvester and loader.

Figures 18, 25:
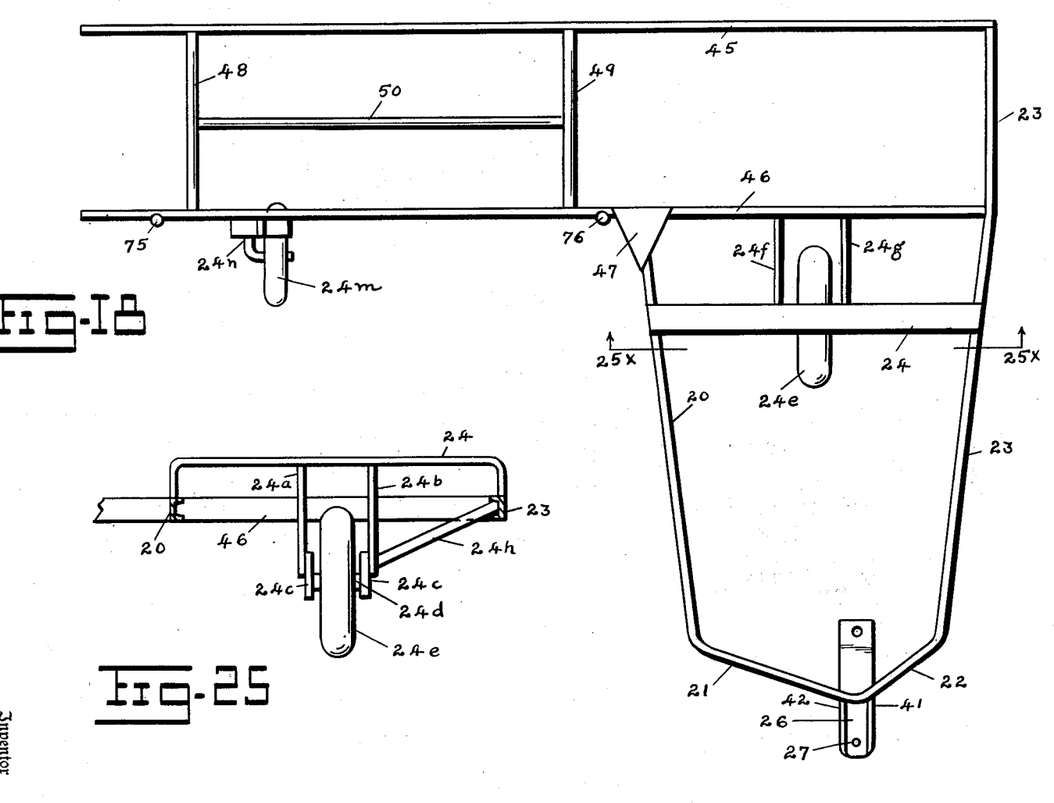
Figure 18 is a top plan view of the frame work of the harvester and loader that is attached to the mower shown in Figure 16.
Figure 25 is a section on the line 25x, 25x of Figure 18 looking in the direction of the arrow showing the supporting wheel and a portion of the frame.

In Figure 18 I have shown the framework of the harvester and loader which is attached to the mower. In this construction a channel bar 20 is bent to form the four sides 20, 21, 22 and 23. Between the sides 20 and 23 is welded the cross bar 24. The draft bar 26 is attached to the channel bars 21 and 22 and is provided with a standard trailer socket 27 by which it is attached to the draw bar of the tractor by a standard ball and socket, these parts comprising a well-known trailer hitch which constitutes no part of my invention. On the power shaft 4 as shown in Figure 3, I have added a sprocket gear 4a having 20 teeth thereon which gear is driven by the shaft 4. This gear is omitted from the shaft 4 in Figure 16 for the purpose of clearness and for the further reason that it is no part of the standard construction of the John Deere power mower.

The mowing machine is provided with a triangular frame 1 comprising the three bars 30, 31 and 32.

These bars are welded together. On the end of the frame extensions 33 and 34 are welded and on these extensions is supported a bar 35 which has upturned ends 35a and 35b that are fastened to the extensions 33 and 34 by bolts, all this is part of the standard construction. For my purpose this bar 35 is turned down side up and still remains fastened to the extensions 33 and 34 by bolts 36 and 37, it being understood that the original bolts are not long enough for my purpose and are replaced by longer bolts for a purpose that will presently be described.

When the frame of the mower is connected to the frame of the harvester as shown in Figure 3 the bar 31 lies parallel to and against the bar 20. The bar 31 is fastened to the bar 20 by means of the bolts 36 and 38. The bar 23 is connected to the bar 35 and the extension 34 by the bolt 37. Attached to the cross bar 35 is the draft bar 26 by a bolt 40. This draft bar is also welded to the underside of the channels 21 and 22. This draft bar 26 is bent upwardly between the bars 21 and 22 and is attached to the bar 35 on the top thereof.

The draft bar 26 extends forwardly from the channels 21 and 22 and triangularly shaped brackets 41 and 42 welded to the sides thereof, the rear ends of which brackets are welded to the channels 21 and 22. This makes a strong connection between the draft bar and the frame of the harvester.

The channel bar 23 extends to the back corner of the frame as shown in Figure 18. To the rear end of the channel bar 23 is welded the channel bar 45 which extends to the left hand end of the frame of the machine. Parallel to the channel bar 45 is placed the channel bar 46 which is also welded to the channel bar 23 and is also welded to the channel bar 20. Triangular plates 47 are welded to the bars 20 and 46 both above and below them for the purpose of strengthening the joint. Tubular braces 48 and 49 are welded between the channels 45 and 46 and these braces are spaced apart by the brace 50 which is welded to the braces 48 and 49.

The brace 24 is placed six inches above the channels 20 and 23 and is supported therefrom, being welded to the top of the channels this is shown in Figure 25. Extending downwardly from the cross bar 24 are the braces 24a and 24b on the lower ends of which are bearings 24c which support the shaft 24d that carries the wheel 24e. The brackets 24a and 24b are connected to the channel bar 46 by braces 24f and 24g which are welded to both parts and the bracket 24b is attached to the bar 23 by the brace 24h. The braces 24f, 24g and 24h are inclined upwardly to the bars 46 and 23.

At the left hand end of the machine as shown in Figure 18 a companion wheel 24m is shown supported from the channel 46 by the bracket 24n. This bracket and wheel is shown in elevation at the bottom of Figure 1.

Carried by the bar 23 is the transmission 55 which is a standard transmission such as is used in automobiles having three speeds forward and one speed reverse, although for the purpose of this invention, the second speed forward is all that is necessary and is preferably used. This transmission is driven by a sprocket gear 51 which in turn is driven by a sprocket chain 52 which in turn is driven by the gear 4a above mentioned.

This transmission drives a shaft 56 on which is carried two sprocket wheels 57 and 58. The sprocket wheel 57 drives a chain 59 which in turn drives a sprocket wheel 60 carried on a shaft 61 carried in the housing 62. On the shaft 61 is also carried a V-pulley 63 which drives a V-belt 64 which in turn drives a V-pulley 65 carried on the shaft 66 which drives the horizontal conveyor 67.

The sprocket wheel 58 drives a chain 58a which drives the elevator which will presently be more fully described.

On the forward end of the shaft 61 is carried a bevel gear 61a which drives bevel bear 61b which is supported in suitable bearings in the housing 61c. The bevel gear 61b drives a shaft 70 which in turn drives a crank shaft 71 through the universal joints and shaft 72.

On the channel bar 46 is welded the two posts 75 and 76 (see Figures 2, 4, 5, 13 and 18). Between the posts 75 and 76 on top of the channel bar 46 is fastened tube 77 about one inch in diameter. Extending forwardly and down from this tube a plate 78 about three inches wide is welded. Near the top of the posts 75 and 76 is supported the tubular cross bar 79, the purpose of which will be described presently. This bar is supported by the brackets 79a and 79b clamped on the posts which permit the vertical adjustment of the bar 79 up and down. To the bottom of the posts 75 and 76 are hinged the forwardly extending bars 82 and 83. These bars are links and at the forward end are pivotally connected to a U-shaped frame 84, having the upright members 84a and 84b and the crossbar at the top 84c.

The lower end of the member 84a has connected to it a bracket 85 by brazing or in any other suitable manner. This bracket has a forward extension 85a. Supported from this extension is the stationary cutter bar 5a and the shoe 9. The cutter bar is fastened to the extension 85a by means of bolts and nuts 85b and the shoe 9 is attached to the cutter bar 5a and extension by the same bolts. At the bottom of the assembly is fastened a wear shoe 85c in any suitable manner.

Figure 23:
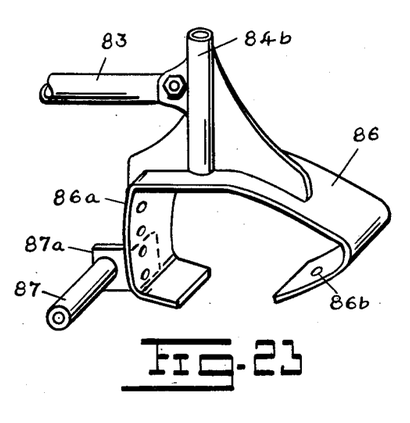
Figure 23 is a perspective view of the post and hood shown at the lower right hand corner of Figure 2.
Figure 24:
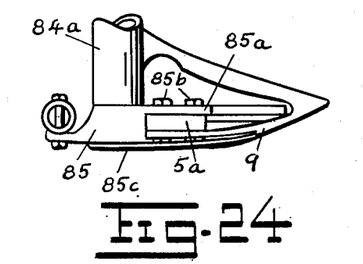
Figure 24 is a detail view of the post and guide for the cutter bar located at the lower left hand corner of Figure 2, it being understood that the ends of the cutter bar are located at Figures 23 and 24 respectively.

At the opposite end of the cutter bar is the hood 86 to which is welded the lower end of the upright member 84b. To the upright member 86a of the hood is attached the shoe 10 shown in Figure 16. This shoe is also attached at the forward end of the hood by a bolt that passes through the hold 86b. In Figure 23 four holes are shown in the upright member 86a through all of which holes the bolts extend that connect the shoe to the hood and the bolts in the two lower holes also connect with the angle bracket 87a that supports the bar 87 that supports the lower end of the ramp shown in Figure 4. Through the opening in the hood 86 extends the pitman 6 which moves the cutter bar 5 back and forth. This assembly permits the end of the cutter bar and ramp to rise and fall because of any unevenness of the ground.

The cutter bars here referred to are the bars used for cutting pea vines and which are replaced by another type of cutter bars when the mower is used for cutting hay, etc.

Figure 12:
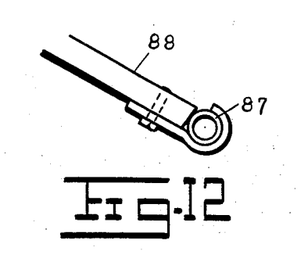
Figure 12 is a detail view of the fastening for one of the slats at the lower end of the ramp.
Figure 13:
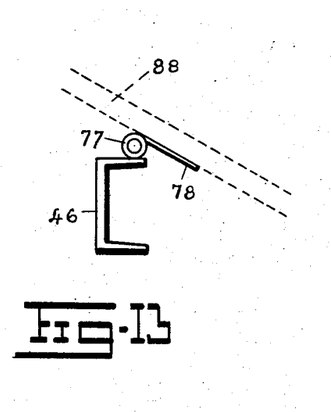
Figure 13 is a detail view of the support for the the upper end of the ramp.

Extending upward and rearwardly from the cross bar 87 is a series of slats 88, each of them being about three inches wide. Each of these slats at the bottom is pivotally connected to the crossbar 87 by a metal strap 87a which is attached to the slat and is bent around the crossbar, shown in Figures 4 and 12.

These slats are inclined upwardly at an angle of about 30°. At the upper end these slats rest loosely on the tube 77 and plate 78. This construction permits the cutters and the crossbar 87 to raise up at either end in passing over an obstruction or uneven ground in which case the upper end of the slats ride on and separately adjust themselves on the tube 77 and plate 78 and they preserve an even uniform deck or ramp up which the pea vines can travel from the cutters to the conveyor 67.

Figures 21, 22:
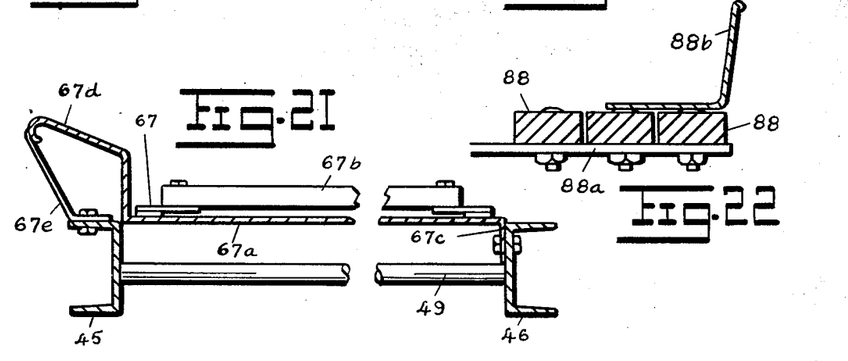
Figure 21 is a sectional view of the horizontal conveyor and the frame that supports it, the section being taken on the line 21x, 21x of Figure 4, the center portion of the section being partly broken away.
Figure 22 is a sectional view through three slats of the ramp, the section being taken on the line 22x, 22x of Figure 4, showing the flexible strip under the slats and showing the angular guard at the side of the ramp.

It will be understood that the conveyor 67 consists of two parallel sprocket chains which travel over a stationary platform 67a. See Figure 4. This stationary platform 67a is shown in section in Figure 21 and on the right hand side the platform is bent down to form a flange 67c by which it is bolted to the channel 46. On the left it is bent up and inclined outwardly as shown at 67d. At the upper end the part 67d is fastened to the channel 45 by straps 67e which at the top are welded to the part 67d and at the bottom are bolted to the channel 45. These sprocket chains are connected together by cross bars 67b which drag the vines either to the right or to the left whichever may be desired and the upper ends of the slats 88 extend over and above the conveyor 67 and its crossbars 67b so that as the pea vines are discharged from the slats they fall down on the conveyor and the platform over which it travels. The slats 88 are bolted to a leather or fabric belt 88a, which holds them together (see Figures 4 and 22). This permits each slat to move upwardly endwise a slight distance independent of the slats on either side, it being understood that the parallel alignment of them is secured by the belt. On each side of the ramp is placed an angle 88b which holds the pea vines from spilling over (see Figures 4 and 22).

On the links 82 and 83 are flanges or brackets 82a and 83a. Near the upper ends of the posts 75 and 76 is fastened counter balancing springs 82b and 83b. These springs are under tension and when the shoes 9 and 10 or cutting bar passes over an obstruction, these springs tend to lift the cutter bars 5 and 5a and the tubular crossbar 87 and the slats connected thereto.

The crank shaft 71 is supported in bearings 89, 89 carried on the upright posts or members 84a and 84b. This crankshaft is bent to form six cranks therein, in two sets the first, third and fifth cranks being numbered 71a at 180° from the second, fourth and sixth cranks being numbered 71b, the bearings of each crank having a throw of eleven inches or revolving in a circle having a diameter of twenty-two inches. These six cranks can be arranged in three sets spaced 120° apart. Each crank has a bearing thereon 90 which moves in a circle with the crank as the crankshaft 71 revolves. To each of these bearings is attached a kicker bar which will now be described.

Figure 7:
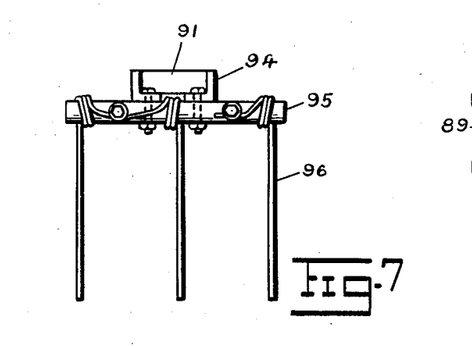
Figure 7 is a front elevation of the fork carried on the forward end of the kicker bar shown in Figure 1.
Figure 9:
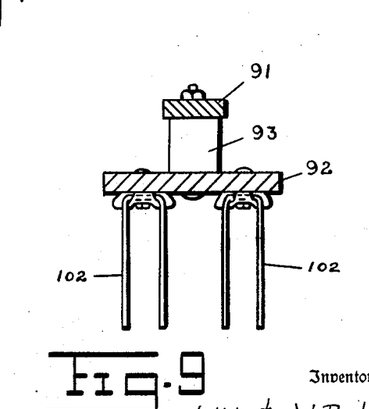
Figure 9 is a section on the line $9x$—$9x$ of Figure 8 looking in the direction of the arrow.

Each of these kicker bars is an assembly of an upper bar 91 that is about three inches wide and seventy-nine inches long and a paddle bar 92, eight inches wide and fifty-eight inches long. The bar 79 passes between the upper bar 91 and the paddle bar 92. It supports the bars 91, and the paddle bars 92 are supported from the bars 91. The bar 79 is provided with guide pins 79c which hold the kicker bars in place. The upper bar is fastened to and separated from the paddle bar by three blocks 93, 93, 93 that are two inches thick, the paddle bar and one block being attached to the upper bar by a bolt that passes through all three of them. See Figure 9. The first and second blocks are spaced about eighteen inches apart and the second and third blocks are spaced about thirty-four inches apart. This spacing is somewhat more than the throw of the crank which moves the assembly back and forth on the cross bar 79 by about twenty-two inches. The bottom throw of each of the cranks is down toward the lower end of the deck and back and up toward the rear end of the deck, it being understood that the assembly of the slats 88 is called an inclined deck. On the lower face of the upper bar 91 at the forward end or at the forward side of the crank shaft 71 is placed a metal channel shaped support 94 on which is placed two sets of downwardly projecting forks or tines. At the outer end is placed a tube 95 that is bolted to the channel shaped support and the tines 96 placed thereon have the base of them coiled around the tube so as to form a yielding spring support for the tines (see Figures 1 and 7).

Figure 10:
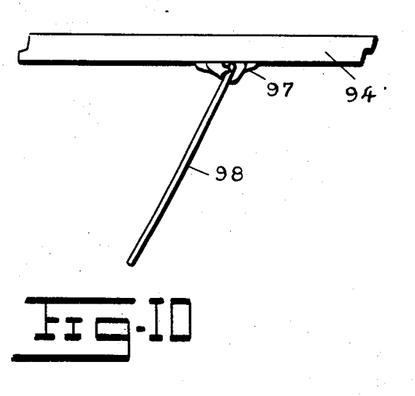
Figure 10 is a detail side view of the second fork that is carried on each one of the kicker bars. This fork is placed immediately under the bearing of the crankshaft that drives the bar and only partially appears in Figure 1.
Figure 11:
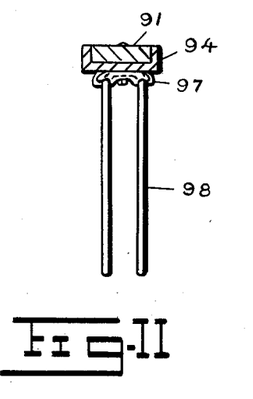
Figure 11 is a section on the line $11x$, $11x$ of Figure 10.

This permits the tines to yield rearwardly if they strike an obstruction. Near the rearward end of the channel support is placed a bracket 97 which supports the fork 98 having two tines thereon which support holds the tines rigid or nearly so, shown in Figures 10 and 11.

Figure 8:
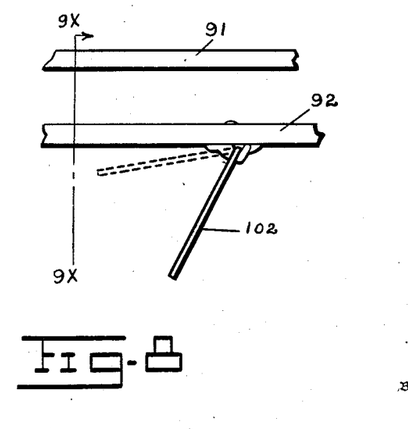
Figure 8 is a side elevation of any one of the three forks that are provided at the center and rear of each of the kicker bars.

On the paddle bar 92 is placed a third, fourth, fifth and sixth fork. The third and fourth forks 99 and 100 are each comprised of two brackets each of which supports two tines, rigid or nearly so. See Figures 1 and 9. Each of these forks therefore, has four tines in it. The fifth and sixth forks 101 and 102 are each composed of two brackets each of which supports two tines and the four tines of each of the fifth and sixth forks are mounted in their supporting brackets so that they can yield rearwardly, shown in Figures 5, 8 and 9. If the tines of the fifth and sixth forks were rigidly mounted in their brackets they would move the pea vines back and forth at the upper edge of the deck or ramp and would cause the vines to clog up on the deck, but because they can swing back they trail over the pea vines on the forward and downward movement of the kicker bars and dig into the pea vines and push them up the ramp on the backward movement and upward movement of the kicker bars. In this way the pea vines are positively pushed up and back on the deck and are discharged over the upper end thereof onto the horizontal conveyor.

Figure 2:
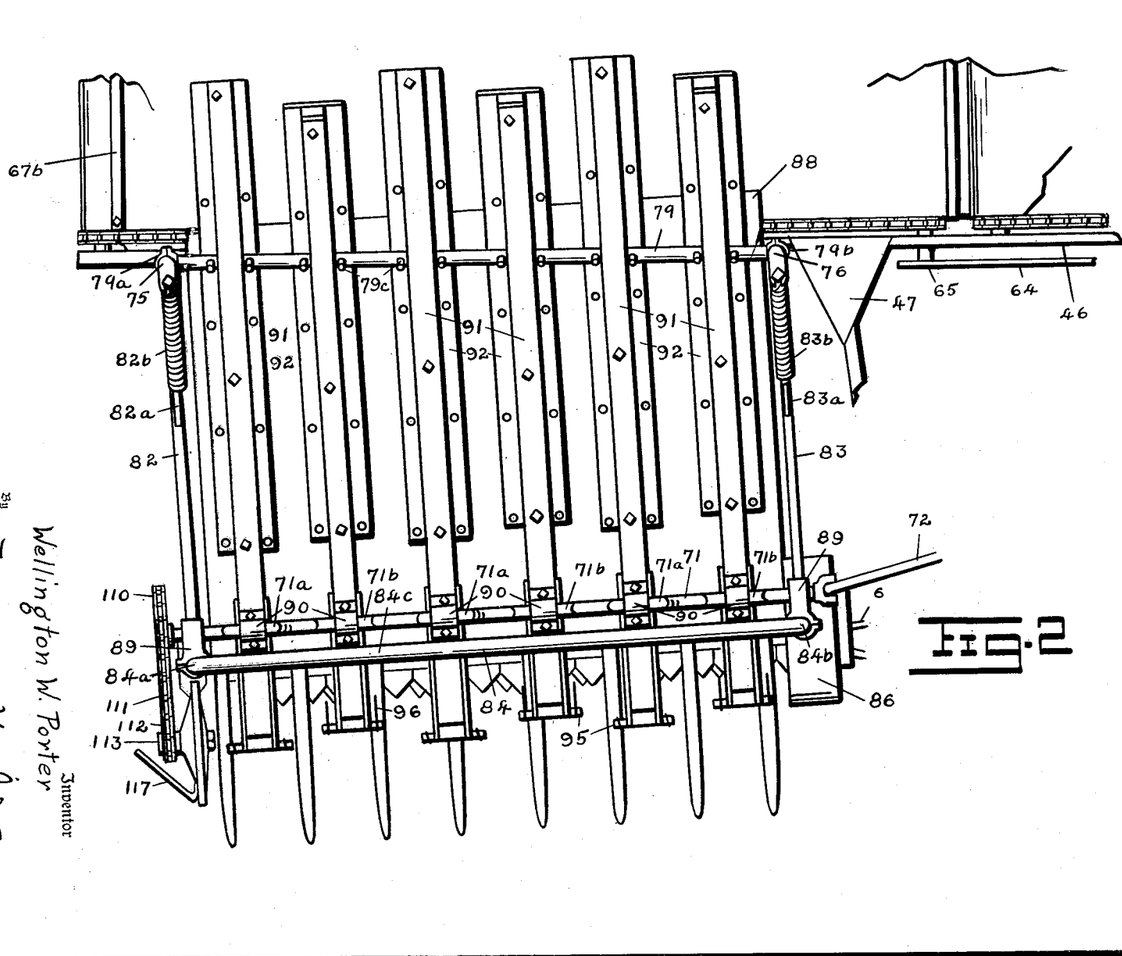
Figure 2 is a top plan view of the cutter of the machine and the inclined platform and the kicker bars that move down and up over the inclined platform.
Figure 4:
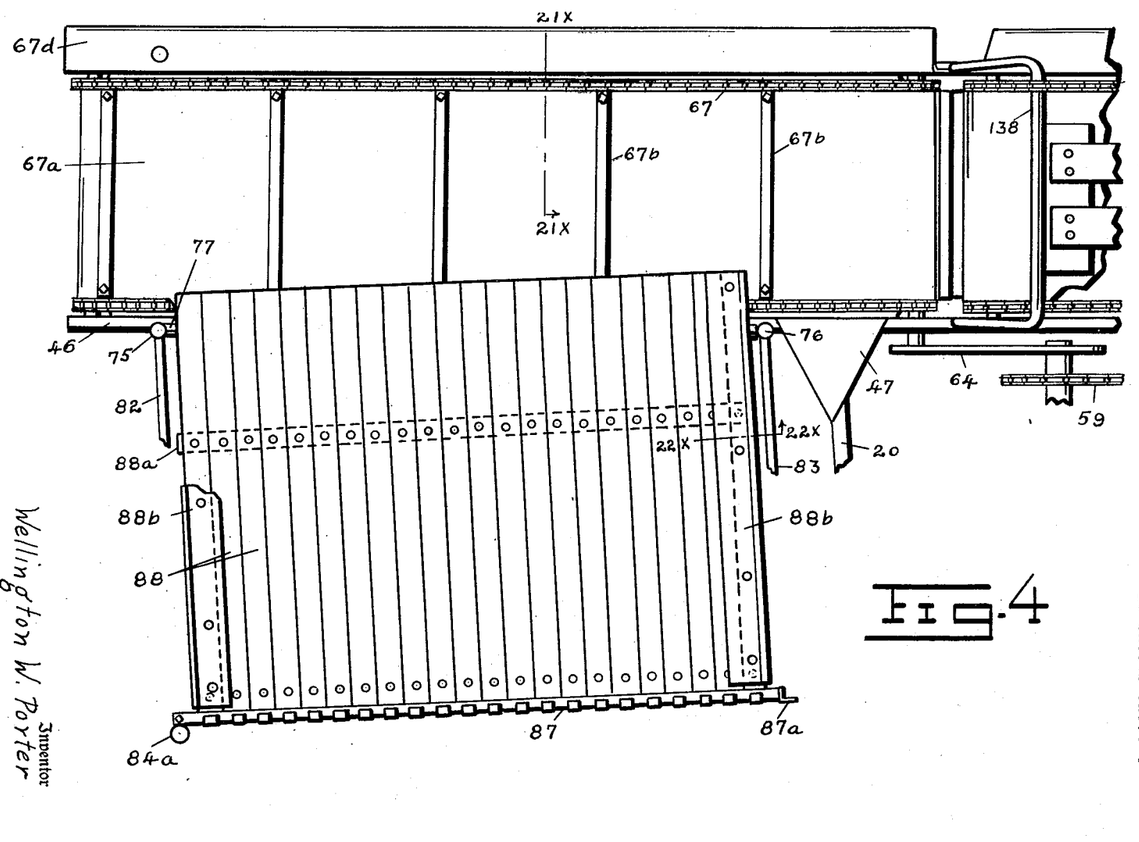
Figure 4 is a top plan view of the inclined platform and the conveyor that moves transversely thereto and the lower end of the elevator.
Figure 5:
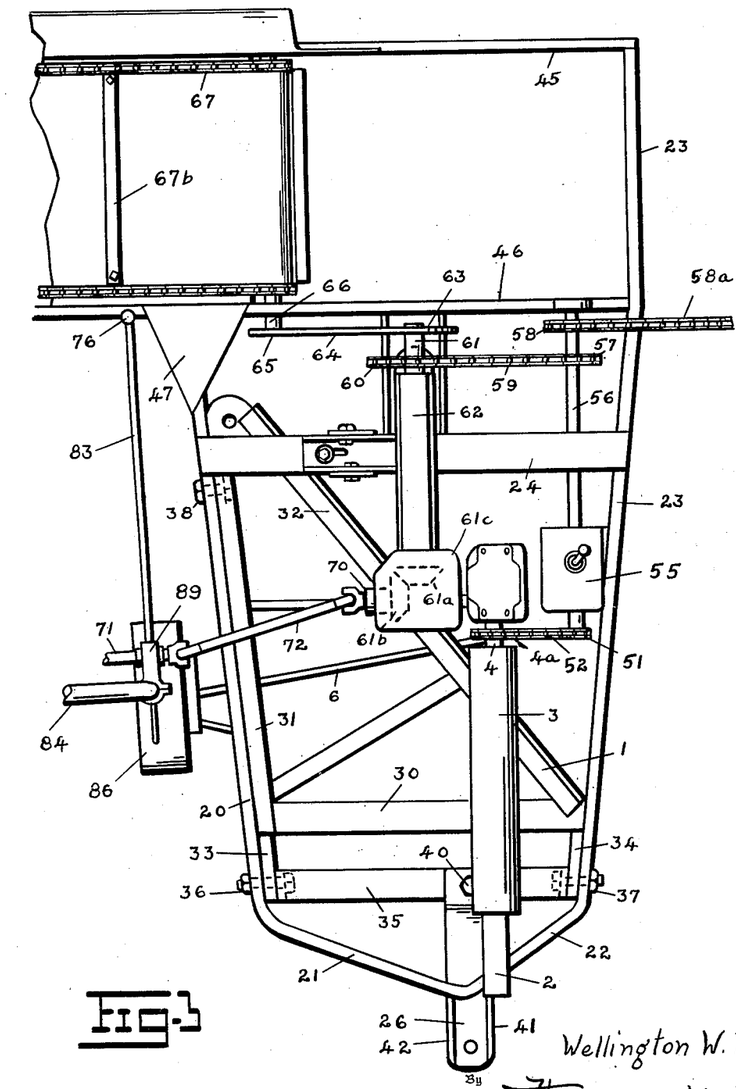
Figure 5 is a detail view of the bar on which the upper ends of the kicker bars ride and one of the upright supports for the bar.
Figure 6:
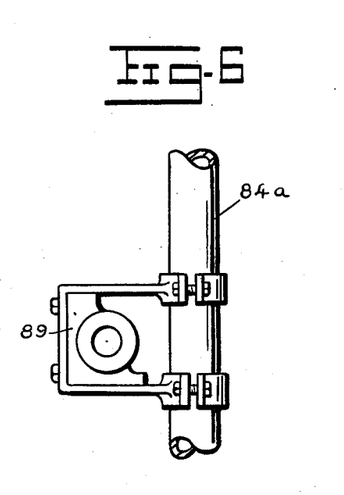
Figure 6 is a detail view of one of the bearings that support the crankshaft that drives the kicker bars and the upright support for that bearing.

It will be understood that there are six forks or sets of tines on each of the kicker bars and that the first and second forks are carried on the upper bar, which is a narrow one as appears in Figure 2 and the third, fourth, fifth and sixth forks are carried on the lower bar, which lower bar is wide as also occurs in Figure 2.

It will also be understood that all the forks on each of the kicker bars extend down to substantially the same level which necessitates that the first and second rakes or forks must be longer than the others because they are mounted on the upper bar.

Figure 1:
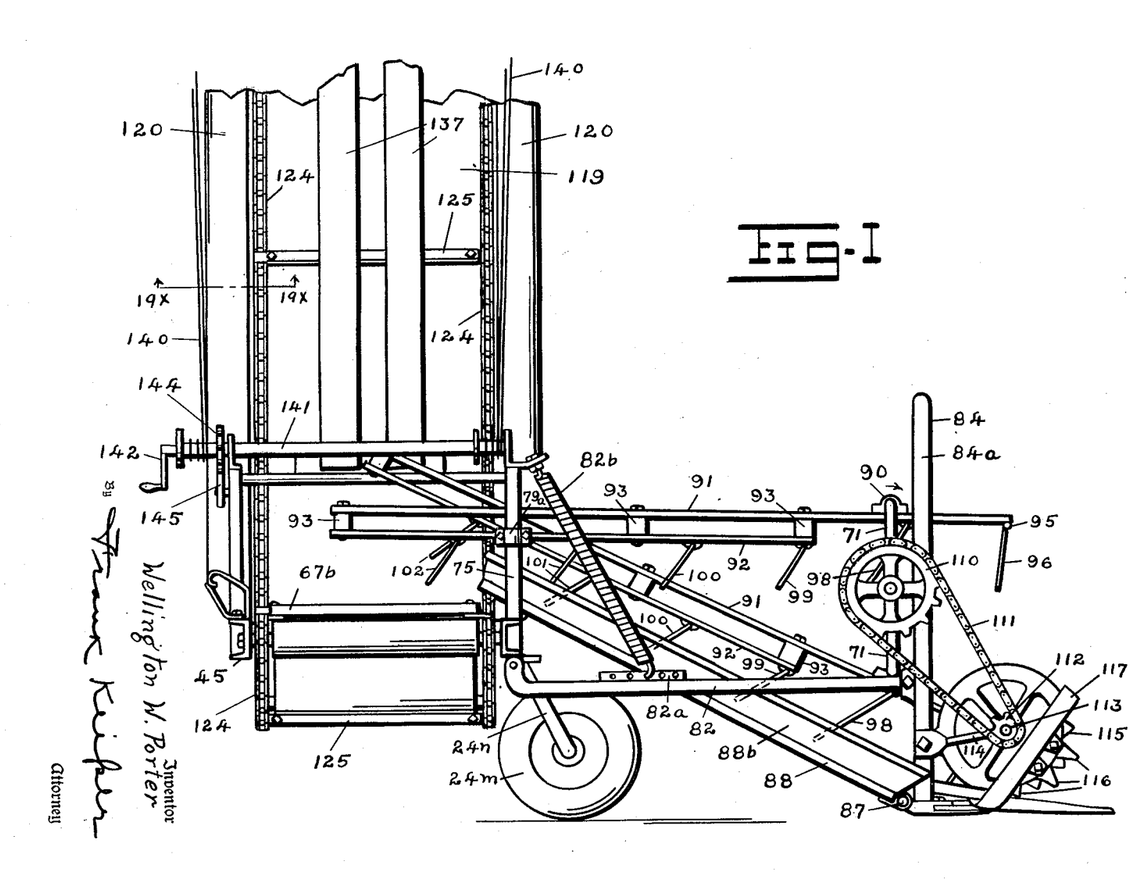
Figure 1 is a side elevation of the machine for harvesting and elevating the pea vines, the upper portion of the elevator being broken away.

On the left hand end of the crankshaft 71 as shown in Figures 1 and 2 is placed a sprocket wheel 110 which rotates therewith. This sprocket wheel drives a chain 111 which drives a small sprocket gear 112 carried on a shaft 113 supported with bearings carried on the bracket 114 supported from the upright bar 84a. The sprocket gear 112 rotates a circular knife 115 having teeth thereon which rotate close to three stationary teeth 116 this cutter rotating in a vertical plane cuts the pea vines to a straight line so that the vines can be cut clean to a given line. On the outside of this cutter assembly is a guard 117.

As above described, the horizontal conveyor is driven by a V-shaped belt 64 and by reversing or crossing this belt the conveyor will be caused to run in one direction and by making the belt run straight the conveyor will be made to run in the other direction. In this way, the pea vines can be deposited on the ground at either end of the conveyor in a compact narrow windrow from which they can be easily forked onto the truck. It will be understood that this mower and harvester can go around the field and harvest a swath of pea vines about six feet wide and place them in a windrow on top of the next uncut vines. The mower and harvester can then go around the field a second time and cut the next swath and deposit the pea vines of the two swaths in a windrow on the next uncut vines. The third time around the mower and harvester will cut a third swath and place the pea vines of that swath and of the two windrows on top of it on the horizontal conveyor. On the third time around, the elevator will be added to the mower and harvester and this elevator will then take the three swaths of pea vines from the horizontal conveyor and carry them up and discharge them over the end thereof so that they will fall on a truck that can then be driven along at the side of the mower and harvester so that the pea vines will be caught thereon as fast as they are harvested. After the harvester and elevator combined has gone around the field once the heavy load of pea vines combined in the three swaths will be elevated from the field and thereafter each time around the harvester and elevator will handle one swath at a time. In the third time around the mower, harvester and elevator will travel much more slowly than it would the first time around because the harvester and elevator on the third time around is handling three times as many pea vines for each foot that it travels forward as it would handle the first time around or the fourth time around.

The elevator by which the pea vines are elevated from the horizontal conveyor 67 will now be described.

Figure 15:
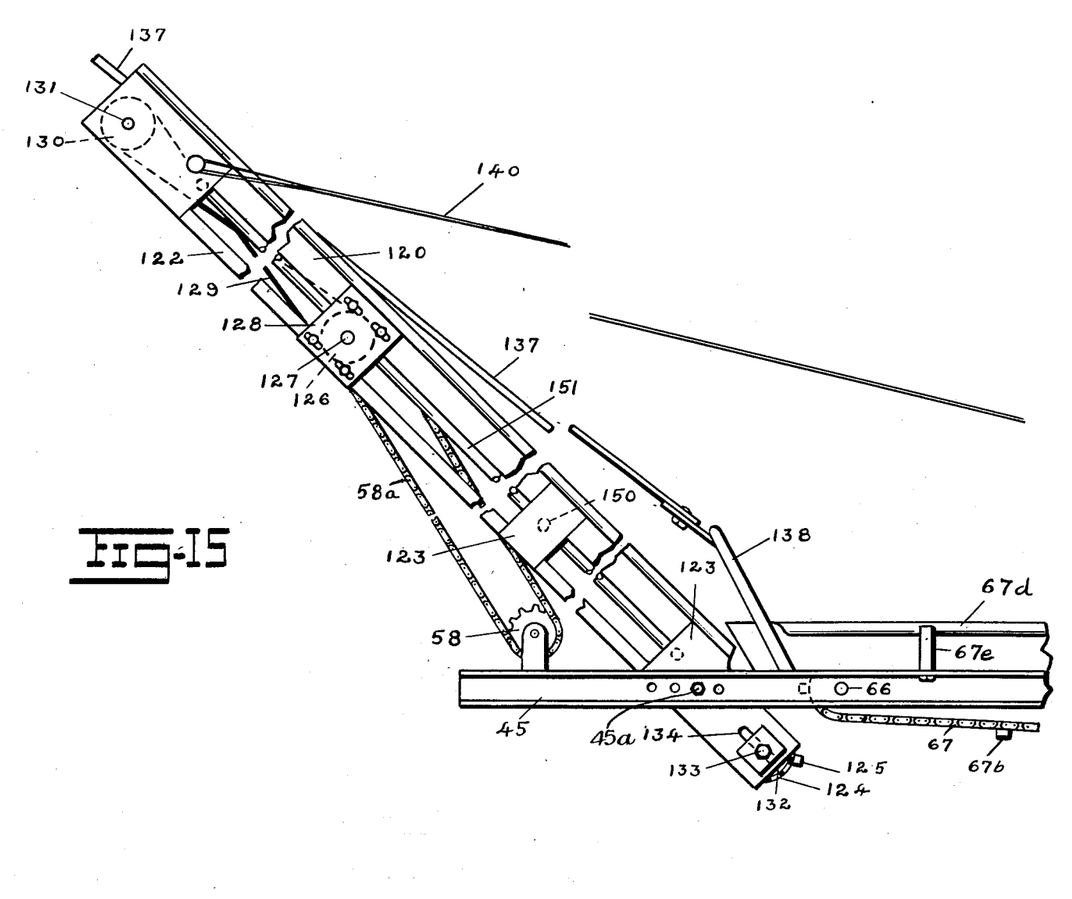
Figure 15 is an elevation of the rear end of the harvester and loader showing the left hand end of the horizontal conveyor and the elevator on which the horizontal conveyor discharges the pea vines. It is understood that part of the elevator is shown broken away because of its great length.
Figure 19:
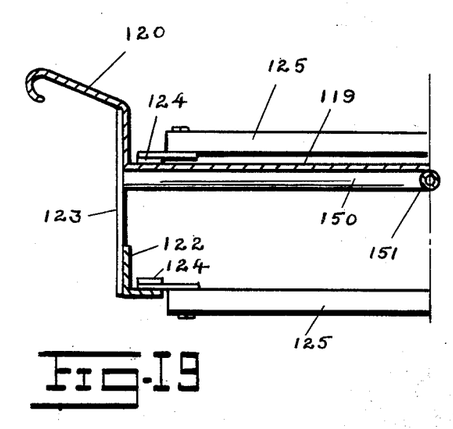
Figure 19 is a sectional view of the elevator, the section being taken on the line $19x$, $19x$ of Figure 1, the section being shown to the center line of the elevator only.

When the elevator is in place the discharge end of the horizontal conveyor 67 extends over the lower end of the elevator and the lower end of the elevator extends under the discharge end of the horizontal conveyor. The elevator is shown as a unit on Figure 15 and is partially shown on Figures 1, 4 and 19. The elevator is built up as a unit which may be as much as sixteen feet in length and near the lower end it is pivotally mounted between the channels 45 and 46. The long bolt on which the elevator swings is indicated at 45a in Figure 15. The floor 119 and sides 120 of the elevator are formed preferably of a single sheet of metal bent to the form as shown in Figure 19. Below the floor of the elevator on each side and extending the length of the elevator is the angle bar supports 122 which are suitably spaced down from the sides of the elevator by spacers 123. These angles 122 on each side are part of the elevator frame and help to stiffen it, and the angles form a guide for the return of the sprocket chains 124, 124. These sprocket chains are at intervals connected by the cross bars 125 which drag or push the pea vines up along the floor of the elevator. The sprocket chains 124 are driven from the sprocket wheel 58 supported from the channels 46. This wheel drives a sprocket chain 58a which in turn drives a sprocket gear 126 carried on a shaft 127 which extends across the elevator frame about one-third of the distance from the top of the frame. This shaft is supported in bearings carried in the blocks 128, 128, which are adjustable to secure the correct spacing for the sprocket chain 58a. Adjacent to the sprocket gear 126 is placed two V-shaped pulleys which drive V-shaped belts 129, which in turn drive pulleys 130. These belts are preferably crossed in order to run the elevator chains 124 in the right direction. The pulleys 130 are carried on a shaft 131 to which are keyed sprocket gears which pull the elevator chains 124, 124. At the bottom of the elevator these sprocket chains 124 pass over the sprocket gears 132, each of which gears is mounted on a separate short shaft 133. Each of these shafts rotates in a bearing which is adjustable along the slot 134 in any well-known manner.

By driving the sprocket chain 58a the V-belts 129 are driven and these in turn drive the sprocket gears at the top of the elevator frame which pull the sprocket chains 124 and the crossbars 125. The crossbars 125 drag the pea vines up the floor of the elevator and the pea vines are held in contact with the elevator bars by the tension boards 137, 137 which rest loosely on the crossbars 125 or the pea vines and serve to hold the pea vines in contact with the bars. At the lower end these bars 137, 137 are supported by the U-shaped frame 138 which hold them away from the elevator a suitable distance so that the horizontal conveyor can place the pea vines on the elevator under these bars. The gearing is arranged so that the conveyor on the elevator travels about one-third faster than does the horizontal conveyor.

The upper end of the elevator frame is supported by cables 140, one on each side of the elevator frame. At the lower end these cables are wound around the shaft 141 of the reel that is operated by crank 142. On the shaft 141 is a ratchet wheel 144 and pawl 145 which holds it against reverse movement when the elevator is raised.

The upright flange on the floor 119 and the angles 122 run the whole length of the elevator. This flange and the angle are connected together by suitable spacers 123, five of which are preferably used although not all of them appear in Figure 15. The spacers are arranged in pairs on opposite sides of the elevator and the spacers of three of these pairs are connected together by tubular crossbars 150. These spacing bars are close enough to the floor of the elevator so that they support the floor of the elevator against any considerable sagging. The ends of these crossbars are welded against the sides of the spacer plates 123. Extending longitudinally of the elevator frame and welded to the middle of the crossbars are bars 151 which provide additional support for the floor of the elevator. This construction serves to strengthen and stiffen the elevator frame and hold it against twisting.

Figure 20:
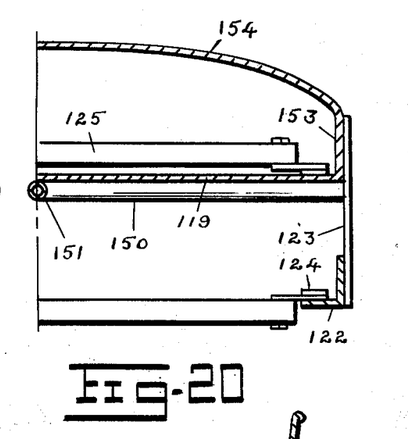
Figure 20 is a sectional view of a modified form of the elevator otherwise corresponding to the section shown in Figure 19.

In Figure 20 I have shown a modification of the construction of the elevator. As shown in Figure 20 the floor of the elevator 119 is bent upwardly in a flange 153 which extends over the elevator and forms a housing 154. This structure prevents the peas from spilling over the edge of the runway, and would also stiffen the elevator structure.

Figure 14:
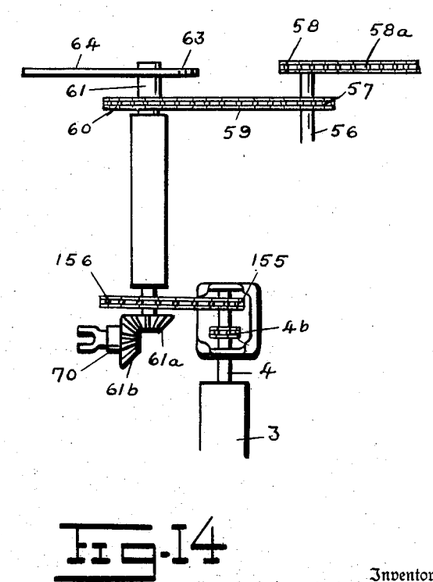
Figure 14 is a diagrammatic view of a modified form of the gearing by which the moving parts of the harvester and loader are driven.

For the purpose of simplifying the gearing shown in Figure 3 I have shown another form of gearing in Figure 14 in which 3 indicates the so-called slip clutch which drives the shaft 4, on which shaft is the sprocket gear 4b which drives the cutter. On the same shaft is a tooth gear wheel 155 which meshes with a gear 156. This gear drives the shaft 61 which in turn drives a sprocket wheel 60 which drives the chain 59, the gearing otherwise being the same as shown in Figure 3. The bevel gears 61a and 61b drive the link 72 that drives the crank shaft 71 as shown in Figures 2 and 3.

I claim:

1. In a pea vine harvester, the combination of a frame, means for cutting the vines flexibly connected to the frame, an upwardly inclined deck for receiving the vines as they are cut extending from said cutting means to said frame, means for pushing the vines up the inclined deck, said deck being composed of narrow slats extending upwardly from near the cutting means, a pivotal mounting for said slats at their lower end, said slats being connected near the top thereof by a flexible belt and flexibly bearing upon said frame, permitting each slat near the top to move up endwise independent of the adjacent slats.

2. In a pea vine harvester, the combination of a frame, means for cutting the vines flexibly connected to the frame, an upwardly inclined deck for receiving the vines as they are cut extending from said cutting means to the frame, means for pushing the vines up the inclined deck, said deck rising or falling on its lower edge at either end with the rising and falling of the cutting means, a pivotal mounting for said slats at their lower end, said inclined deck being composed of narrow parallel slats held together on the underside by a flexible strap permitting each slat to move up endwise somewhat independent of the adjacent slats, a transverse bar flexibly supporting said slats near the upper edge thereof and supported by said frame.

3. In a harvesting machine an inclined ramp comprising parallel slats, a bar at the bottom of the ramp to which each of said slats is pivotally and loosely connected, a bar at the top of the ramp on which said slats rest loosely, flexible means connecting said slats together, but permitting each slat to have a movement of its own independent of the slats on either side of it and means overlying said ramp for elevating vines and the like up said ramp.

4. In a harvesting machine an inclined ramp comprising parallel slats, a bar at the bottom of the ramp to which each of said slats is pivotally and loosely connected, a bar at the top of the ramp on which said slats rest loosely, flexible means on the underside of said slats connecting said slats together, but permitting each slat to have a movement of its own independent of the slats on either side of it.

5. In a harvesting machine an inclined ramp comprising parallel slats, a bar at the bottom of the ramp to which each of said slats is pivotally and loosely connected, a bar at the top of the ramp on which said slats rest loosely, flexible means connecting said slats together, but permitting each slat to have a movement of its own independent of the slats on either side of it, said bar at the bottom of the ramp being supported so that it is free to rise and fall at either end with the slats at its end independent of the same bar and its slats at the other end.

6. In a harvester, a frame comprising a rearward transverse member, and a forward transverse member flexibly supported therefrom, a warpable ramp having its lower forward end carried by said flexibly supported member, a cutter carried by said last named member, and means warpable with the ramp and located above the ramp for moving vines and the like up the ramp.

7. In a harvester, a frame comprising a rearward transverse member, and a forward transverse member flexibly supported therefrom, a warpable ramp having its lower forward end carried by said flexibly supported member, a cutter carried by said last named member, a transverse multiple throw crank shaft journaled above said last named member in substantial parallelism with said last named member, a transverse guide bar positioned above the upper end of said ramp and supported from said rearward member, bars slidably mounted upon said guide bar, and having their forward ends mounted upon the throes of said cranks, paddle faces on the under side of said bars to the rear thereof forming guide faces above said ramp, and means carried by said bars for moving material up the ramp, between the ramp and said faces, upon rearward movement of said slidably mounted bars, and for releasing said material upon forward movement of the bars.

8. In a harvester, a frame comprising a rearward transverse member, and a forward transverse member flexibly supported therefrom, a warpable ramp having its lower forward end carried by said flexibly supported member, a cutter carried by said last named member, means above the ramp for moving vines and the like up the ramp, and means for receiving said material at the rear of the ramp and delivering it transversely of the ramp to one side of the frame.

9. In a harvester, a frame comprising a rearward transverse member, and a forward transverse member flexibly supported therefrom, a warpable ramp having its lower forward end carried by said flexibly supported member, a cutter carried by said last named member, a transverse multiple throw crank shaft journaled above said last named member in substantial parallelism with said last named member, a transverse guide bar positioned above the upper end of said ramp and supported from said rearward member, bars slidably mounted upon said guide bar, and having their forward ends mounted upon the throes of said cranks, paddle faces on the underside of said bars to the rear thereof forming guide faces above said ramp, and means carried by said bars for moving material up the ramp, between the ramp and said faces, upon rearward movement of said slidably mounted bars, and for releasing said material upon forward movement of the bars, and means for receiving said material at the rear of the ramp and delivering it transversely of the ramp to one side of the frame.

10. In a harvester, a frame comprising a rearward transverse member, and a forward transverse member flexibly supported therefrom, a warpable ramp having its lower forward end carried by said flexibly supported member, said ramp being composed of spaced slats extending fore and aft, and being flexibly secured at their ends and to one of said transverse members, and resting on the other, a cutter carried by said last named member, and means above the ramp for moving vines and the like up the ramp.

11. In a harvester, a frame comprising a rearward transverse member, and a forward transverse member flexibly supported therefrom, a warpable ramp having its lower forward end carried by said flexibly supported member, said ramp being composed of spaced slats extending fore and aft, and being flexibly secured at their ends and to one of said transverse members, and resting on the other, a cutter carried by said forward member, a transverse multiple throw crank shaft journaled above said forward member in substantial parallelism with said forward member, a transverse guide bar positioned above the upper end of said ramp and supported from said rearward member, bars slidably mounted upon said guide bar, and having their forward ends mounted upon the throes of said cranks, paddle faces on the under side of said bars to the rear thereof forming guide faces above said ramp, and means carried by said bars for moving material up the ramp, between the ramp and said faces, upon rearward movement of said slidably mounted bars, and for releasing said material upon forward movement of the bars.

12. In a harvester, a frame comprising a rearward transverse member, and a forward transverse member flexibly supported therefrom, a warpable ramp having its lower forward end carried by said flexibly supported member, said ramp being composed of spaced slats extending fore and aft, and being flexibly secured at their ends and to one of said transverse members, and rest on the other, a cutter carried by said last named member, means above the ramp for moving vines and the like up the ramp, and means for receiving said material at the rear of the ramp and delivering it transversely of the ramp to one side of the frame.

13. In a harvester, a frame comprising a rearward transverse member, and a forward transverse member flexibly supported therefrom, a warpable ramp having its lower forward end carried by said flexibly supported member, said ramp being composed of spaced slats extending fore and aft, and being flexibly secured at their ends and to one of said transverse members, and resting on the other, a cutter carried by said forward member, a transverse multiple throw crank shaft journaled above said last named member in substantial parallelism with said last named member, a transverse guide bar positioned above the upper end of said ramp and supported from said rearward member, bars slidably mounted upon said guide bar, and having their forward ends mounted upon the throes of said cranks, paddle faces on the under side of said bars to the rear thereof forming guide faces above said ramp, and means carried by said bars for moving material up the ramp between the ramp and said faces, upon rearward movement of said slidably mounted bars, and for releasing said material upon forward movement of the bars, and means for receiving said material at the rear of the ramp and delivering it transversely of the ramp to one side of the frame.

14. In a harvester, a frame comprising a rearward transverse member, and a forward transverse member flexibly supported therefrom, a warpable ramp having its lower forward end carried by said flexibly supported member, gathering means extending transversely substantially the width of the forward ramp end, and carried by said last named member, and means warpable with the ramp and located above the ramp for moving vines and the like up the ramp.

15. In a harvesting machine, an inclined ramp comprising parallel slats, a bar at the bottom of the ramp to which each of said slats is pivotally and loosely connected, a bar at the top of the ramp on which said slats rest loosely, flexible means connecting said slats together, but permitting each slat to have an endwise movement of its own independent of the slats on either side of it as the bar at the bottom is raised at either end.

16. In a harvesting machine, an inclined ramp comprising parallel slats, a bar at the bottom of the ramp to which each of said slats is pivotally and loosely connected, a bar at the top of the ramp on which said slats rest loosely, flexible means placed remote from the bar at the bottom of the ramp, said means being attached to each slat and connecting said slats together, but permitting said slats to move endwise and upwards progressively as the bar at the bottom is raised at either end, the endwise and upward movement of each slat corresponding to the upward movement of that part of the bar at the bottom to which the slat is attached.

17. In a harvesting machine, an inclined ramp comprising parallel slats, a bar at the bottom of the ramp to which each of said slats is pivotally and loosely connected, a bar at the top of the ramp on which said slats rest loosely, said slats being adapted to move endwise and upwards progressively as the bar at the bottom is raised at either end, the endwise and upward movement of each slat corresponding to the upward movement of that part of the bar at the bottom to which the slat is attached.

WELLINGTON W. PORTER.

REFERENCES CITED

The following references are of record in the file of this patent:

UNITED STATES PATENTS

| Number | Name | Date |
| --- | --- | --- |
| 95,397 | Whiteley | Sept. 28, 1869 |
| 716,374 | Brunger | Dec. 23, 1902 |
| 967,243 | Rosenthal | Aug. 16, 1910 |
| 1,156,543 | Nevill | Oct. 12, 1915 |
| 1,271,427 | Burke | July 2, 1918 |
| 1,532,022 | Bamford | Mar. 31, 1925 |
| 1,543,623 | Smart | June 23, 1925 |
| 1,546,436 | Coultas et al. | July 21, 1925 |
| 1,849,306 | Mac Gregor | Mar. 15, 1932 |
| 1,903,769 | King | Apr. 18, 1933 |
| 1,932,660 | Grant | Oct. 31, 1933 |
| 1,960,978 | Redpath et al. | May 29, 1934 |
| 2,258,517 | Rose | Oct. 7, 1941 |

FOREIGN PATENTS

| Number | Country | Date |
| --- | --- | --- |
| 214,236 | Germany | Oct. 8, 1909 |
| 272,887 | Italy | Mar. 24, 1930 |